(12) United States Patent
Aoyama et al.

(10) Patent No.: US 6,825,436 B1
(45) Date of Patent: Nov. 30, 2004

(54) WELDING METHOD AND WELDING DEVICE OF CAP NUT

(76) Inventors: Yoshitaka Aoyama, 20-11, Makitsukadai 2-Cho, Sakai-Shi, Osaka 590-0114 (JP); Shoji Aoyama, 20-11, Makitsukada 2-Cho, Sakai-Shi, Osaka 590-0114 (JP)

( * ) Notice: Subject to any disclaimer, the term of this patent is extended or adjusted under 35 U.S.C. 154(b) by 0 days.

(21) Appl. No.: 10/019,731
(22) PCT Filed: Sep. 25, 2000
(86) PCT No.: PCT/JP00/06588
§ 371 (c)(1),
(2), (4) Date: Apr. 15, 2002
(87) PCT Pub. No.: WO01/91964
PCT Pub. Date: Dec. 6, 2001

(30) Foreign Application Priority Data

| May 27, 2000 | (JP) | ........................ 2000-197336 |
| Jun. 3, 2000 | (JP) | ........................ 2000-205881 |
| Jun. 14, 2000 | (JP) | ........................ 2000-218077 |

(51) Int. Cl.⁷ ............................................. B23K 11/00
(52) U.S. Cl. ..................... 219/117.1; 219/93; 219/119
(58) Field of Search .............................. 219/117.1, 119, 219/93

(56) References Cited

U.S. PATENT DOCUMENTS 3,562,482 A * 2/1971 Friedberg et al. ......... 219/86.33
4,123,961 A * 11/1978 Chaivre et al. ............. 411/429

FOREIGN PATENT DOCUMENTS

JP         10-26275        *  1/1998
JP         11-156555 A     *  6/1999

* cited by examiner

Primary Examiner—Kiley Stoner
Assistant Examiner—Len Tran

(57) ABSTRACT

One electrode 6 is provided with a recess 16 for receiving and holding a cap 13 and the other electrode 8 is provided with a recess 36 for receiving and holding a nut 10. The thus held cap 13 and nut 10 are pressed against each other by the advance of the electrode 6 and have an electric current passed therethrough, whereby both are welded. Further, to feed parts to the recesses 16 and 36 of both electrodes, there are installed a cap feeding mechanism 19 and a nut feeding mechanism 38 that perform square motions, respectively having feed members 18 and 37 adapted to hold the cap 13 and nut 10 therein.

18 Claims, 11 Drawing Sheets

WELDING METHOD AND WELDING DEVICE OF CAP NUT

BACKGROUND ART

As for a nut for fixing an automobile wheel, a box nut is used in order to prevent entry of water, mud or the like or to improve the external appearance. This box nut has a bowl-shaped cap welded to the nut. The present invention belongs to the technical field that relates to the welding of such nut.

In the prior art, a cap and a nut are abutted together and in this state they are held by a chuck, and with the cap and nut integrally held standby on the axis between both electrodes, the latter advance to press the cap and nut and a welding current is passed to complete the welding. Particularly, electric resistance welding is performed by holding a nut on the flat end surface of the fixed electrode by a chuck, fitting thereon a cap held also by a chuck, and advancing the movable electrode into this state. Such system is disclosed in FIG. 3 of Japanese Unexamined Patent Publication Hei9-85464.

With the prior art described above, since the cap and nut, which are not welded together, are held by the chuck, iron scraps from somewhere or the like entering the holding dogs of the chuck causes a misalignment in the relative position between the cap and nut, resulting in the two parts being welded in the deviated state. Since the cap and nut held by the chuck are kept standby and the electrodes are advanced thereto, even the slightest misalignment in the relative position between the electrodes, cap and nut leads to the failure of the cap and nut to be correctly held by the electrodes, so that the cap and nut are nonalignedly welded or the cap is driven out when abutted against the nut. Further, with the chuck system, it is necessary to greatly increase the precision of the chuck mechanism, requiring that a correspondingly high installation be prepared. As the number of parts handled by the chuck mechanism increases, the movable parts, such as jaws and shaft, wear, incurring a lowering in operating precision.

DISCLOSURE OF INVENTION

According to an embodiment of the present invention, a box nut welding method is characterized in that one electrode is provided with a recess for receiving and holding a bowl-shaped cap and the other electrode is provided with a recess for receiving and holding a nut, the arrangement being such that the open end of the cap and the end surface of the nut held by the respective electrodes are pressed against each other by the advance of the electrode, whereupon a welding current is passed, thereby welding the cap and nut. Since the cap and nut are respectively held in the recesses of the electrodes, both parts assume the correct relative position when both electrodes on the same axis approach each other to abut both parts against each other; thus, a box nut of satisfactory welding precision is obtained. Since the cap and nut are received in the recesses of the electrodes, the relative position between the electrodes and the parts held therein can be accurately set, so that welded parts of high precision as described above can be obtained. Further, since the cap and nut are held directly by the electrodes, the need for employing a chuck mechanism as used in the prior art is eliminated, freeing the operator from the foregoing problems caused by the use of a chuck.

The cap and nut are moved axially of the electrodes after their axes may be positioned coaxial with the axis of the electrodes, and then they are received and held in the recesses of the electrodes. That is, the loci of the cap and nut are moved to the recesses of the electrodes after the cap and nut are coaxial with the axis of the electrodes, so that the loci of both parts assume the simplest form; therefore, the process for holding the parts in the electrodes is simply and reliably effected, ensuring that reliable operation is attained.

The cap and nut may reach the recesses of the electrodes as they are held by respective feed members that perform square motions. Both parts reach the recesses of the electrodes as they are held by the feed members, in which case the loci of the feed members are provided by square motions, thus making it easier to attain a reliable operation including movement of both parts to the electrode recesses after both parts are positioned on the electrode axis. That is, it is required that the feed members provide a locus for returning to the parts-receiving position and a locus for moving to the advance-ready position after parts have been received. These requirements are reliably achieved by the square motions.

A guide pin adapted to fit into the threaded hole in the nut may be installed in the recess of the nut holding electrode. As for the holding of the nut by the electrode, installing such guide pin can prevent the nut from abnormally tilting during pressing for welding, so that correct abutment of the nut against the cap is ensured. As for the cap, if the cap is bowl-shaped, the cap is pressed against the nut end surface with the uniformity of entire open end of the cap during pressing against the nut in a manner analogous to a phenomenon in which a ball freely rolls in the electrode recess. That is, the cap has a self-aligning action imparted thereto.

According to another embodiment of the invention, a box nut welding device is characterized in that one electrode is provided with a recess for receiving and holding a bowl-shaped cap and the other electrode is provided with a recess for receiving and holding a nut, both electrodes being disposed on the same axis, the device having a cap feeding mechanism for carrying the cap to the recess of the electrode subsequent to the positioning of the cap coaxial with the electrode axis, and a nut feeding mechanism for carrying the nut to the recess of the electrode subsequent to the positioning of the nut coaxial with the electrode axis. Since the cap and nut are respectively held in the recesses of the electrodes, both parts assume the correct relative position when both electrodes on the same axis approach each other to abut both parts against each other; thus, a box nut of satisfactory welding precision is obtained. Since the cap and nut are received in the recesses of the electrodes, the relative position between the electrodes and the parts held therein can be accurately set, so that welded parts of high precision as described above can be obtained. Further, since the cap and nut are held directly by the electrodes, the need for employing a chuck mechanism as used in the prior art is eliminated, freeing the operator from the problems caused by the use of a chuck.

Driving means may be combined so that the feed members of the cap feeding mechanism and nut feeding mechanism perform square motions. Both parts reach the recesses of the electrodes as they are held by the feed members, in which case the loci of the feed members are provided by square motions, thus making it easier to attain a reliable operation including movement of both parts to the electrode recesses after both parts are positioned on the electrode axis. That is, it is required that the feed members provide a locus for returning to the parts-receiving position and a locus for moving to the advance-ready position after parts have been received. These requirements are reliably achieved by the square motions.

A guide pin adapted to fit into the threaded hole in the nut may be installed in the recess of the nut holding electrode, the guide pin having a means for allowing the box nut to escape from the electrode recess after welding. As for the holding of the nut by the electrode, installing such guide pin can prevent the nut from abnormally tilting during pressing for welding, so that correct abutment of the nut against the cap is ensured. Where the guide pin is provided with an escape means, such as a compressed air spout or a push-out rod, the completed box nut is allowed to escape from the electrode. Particularly, since the cap is internally acted on by an escape force, the force necessary for escape is reliably transmitted to the box nut and the reliability of escape itself is increased. As for the cap, if the cap is bowl-shaped, the cap is pressed against the nut end surface with the uniformity of entire open end of the cap during pressing against the nut in a manner analogous to a phenomenon in which a ball freely rolls in the electrode recess. That is, the cap has a self-aligning action imparted thereto.

According to still other embodiment of the invention, a box nut welding device is characterized in that one electrode is provided with a recess for receiving and holding a bowl-shaped cap and the other electrode is provided with a recess for receiving and holding a nut, both electrodes being disposed on the same axis, the device having a cap feeding mechanism for carrying the cap to the recess of the electrode subsequent to the positioning of the cap coaxial with the electrode axis, and a nut feeding mechanism for carrying the nut to the recess of the electrode by a feed rod advancing in a direction inclined with respect to the axis of the electrode. Since the cap and nut are respectively held in the recesses of the electrodes, both parts assume the correct relative position when both electrodes on the same axis approach each other to abut both parts against each other; thus, a box nut of satisfactory welding precision is obtained. Since the cap and nut are received in the recesses of the electrodes, the relative position between the electrodes and the parts held therein can be accurately set, so that welded parts of high precision as described above can be obtained. Further, since the cap and nut are held directly by the electrodes, the need for employing a chuck mechanism as used in the prior art is eliminated, freeing the operator from said problems caused by the use of a chuck. Further, since the nut is fed to the electrode recess by the feed rod advancing in an inclined direction, it becomes possible to bring the nut to the electrode from a remote place, a fact that is convenient when the space around the electrode is limited.

According to still other embodiment of the invention, a box nut welding device is characterized in that one electrode is provided with a recess for receiving and holding a bowl-shaped cap and the other electrode is provided with a recess for receiving and holding a nut, both electrodes being disposed on the same axis, the device having a cap feeding mechanism for carrying the cap to the recess of the electrode subsequent to the positioning of the cap coaxial with the electrode axis, and a nut feeding mechanism for carrying the nut to the recess of the electrode subsequent to the positioning of the nut coaxial with the electrode axis, the feed member of the cap feeding mechanism for holding the cap and the feed member of the nut feeding mechanism for holding the nut having a relative position such that when both feed members are advanced, they do not interfere with each other. Since the cap and nut are respectively held in the recesses of the electrodes, both parts assume the correct relative position when both electrodes on the same axis approach each other to abut both parts against each other; thus, a box nut of satisfactory welding precision is obtained.

Since the cap and nut are received in the recesses of the electrodes, the relative position between the electrodes and the parts held therein can be accurately set, so that welded parts of high precision as described above can be obtained. Further, since the cap and nut are held directly by the electrodes, the need for employing a chuck mechanism as used in the prior art is eliminated, freeing the operator from said problems caused by the use of a chuck. With the chuck mechanism, if an iron scrap or the like is present between the chuck dog and the part, the part is held in its inclined state, so that correct welding is sometimes unattainable. Further, the feed member of the cap feeding mechanism and the feed member of the nut feeding mechanism are in positional relation such that they do not interfere with each other when they are advanced. This results in the cap feeding mechanism and the nut feeding mechanism being concentrated in an area as close to the electrode axis as possible since both feed members are allowed to advance between both electrodes, a fact that is very advantageous for minimizing the space for the entire welding device. And since both feed members are allowed to simultaneously advance between the electrodes, the holding of the cap and nut in the electrodes can be efficiently effected in a short time.

The advancing and retracting directions of the feed member of the cap feeding mechanism and the advancing and retracting directions of the feed member of the nut feeding mechanism may be opposed to each other in a straight line as seen in the direction of the electrode axis or cross each other. This allows both feed members to advance and retract without interfering with each other, as described above, so that space minimization and short-time feeding are made possible. Further, when the advance and retraction axes of both feed members cross each other as described above, the cap feeding mechanism and the nut feeding mechanism can be brought close to each other and concentrated, a fact that is further advantageous in respect of space.

Alternatively, a box nut welding device is characterized in that one electrode is provided with a recess for receiving and holding a bowl-shaped cap and the other electrode is provided with a recess for receiving and holding a nut, both electrodes being disposed on the same axis, both electrodes being disposed on the same axis, the device having a cap feeding mechanism for carrying the cap to the recess of the electrode subsequent to the positioning of the cap coaxial with the electrode axis, and a nut feeding mechanism for carrying the nut to the recess of the electrode subsequent to the positioning of the nut coaxial with the electrode axis, the feed member of the cap feeding mechanism for holding the cap and the feed member of the nut feeding mechanism for holding the nut having a relative position such that when both feed members are advanced toward the electrode axis, they do not interfere with each other, the advancing and retracting directions of the feed member of the cap feeding mechanism and the advancing and retracting directions of the feed member of the nut feeding mechanism being opposed to each other as seen in the direction of the electrode axis or crossing each other.

According to still other embodiment of the invention, a box nut welding device is characterized by comprising a movable electrode and a fixed electrode that are disposed coaxial with a vertical axis, the fixed electrode being formed with a recess for holding a nut, a feed member adapted to advance and retract in a direction substantially at right angles with the axis while holding a cap, the feed member being constructed to move vertically along the axis, the arrangement being such that with a cap mounted on the nut held by the fixed electrode, the movable electrode is lowered to effect pressing and passage of current.

The advance of the feed member stops where the axis of the cap held by the feed member coincides with the axis of the electrode, and then the feed member moves along the axis of the electrode and the open end of the cap is mounted on the end surface of the nut. Then the movable electrode advances to press the cap against the nut and passes a current therethrough to complete welding. After completion, the box nut is removed from the recess of the fixed electrode. In addition, the feed member executes a so-called square motion comprising advancing movement toward the electrode axis, downward movement along the electrode axis, retracting movement, and upward movement. Thus, an accurate and highly durable device is provided by employing not a means unstable in terms of precision, such as a chuck, and but a simple action comprising a combination of advance and retraction of the feed member and its movement in the direction of the axis of the electrodes. The fixed electrode is formed with a recess and the nut held therein is on standby with good stability. Since the system is such that the cap is mounted on the standby nut, positional deviation of the cap never takes place. Further, since the behavior imparted to the cap is simple as described above, he mechanism employed herein is simplified and saves much installation space.

When the feed member for caps is formed with a cap receiving chamber, the cap is held in the receiving chamber and reliably moved as described above. Further, since the cap movement is effected with the cap put in the receiving chamber, even if interference with an adjacent member should occur during movement, the cap remains in its protected state, never accidentally falling off.

The receiving chamber may be opened in the lower side and may be formed with an inlet opposed to and communicating with a cap feed chute and an outlet through which a cap relatively goes out of the receiving chamber, the receiving chamber having installed therein an attracting means for holding a cap. Since the inlet and outlet for the cap into and from the receiving chamber are thus formed and since the lower side of the receiving chamber is opened, introduction of the cap into the receiving chamber, the mounting of the cap on the nut, and retraction of the feed member with the cap remaining therein are reliably realized.

The open end of a cap may fit in an annular groove formed in the end surface of a nut. Such fitting in the groove ensures that the mounting of the cap on the end surface of the nut is realized with high stability.

BEST MODE FOR CARRYING OUT THE INVENTION

Figure 1:
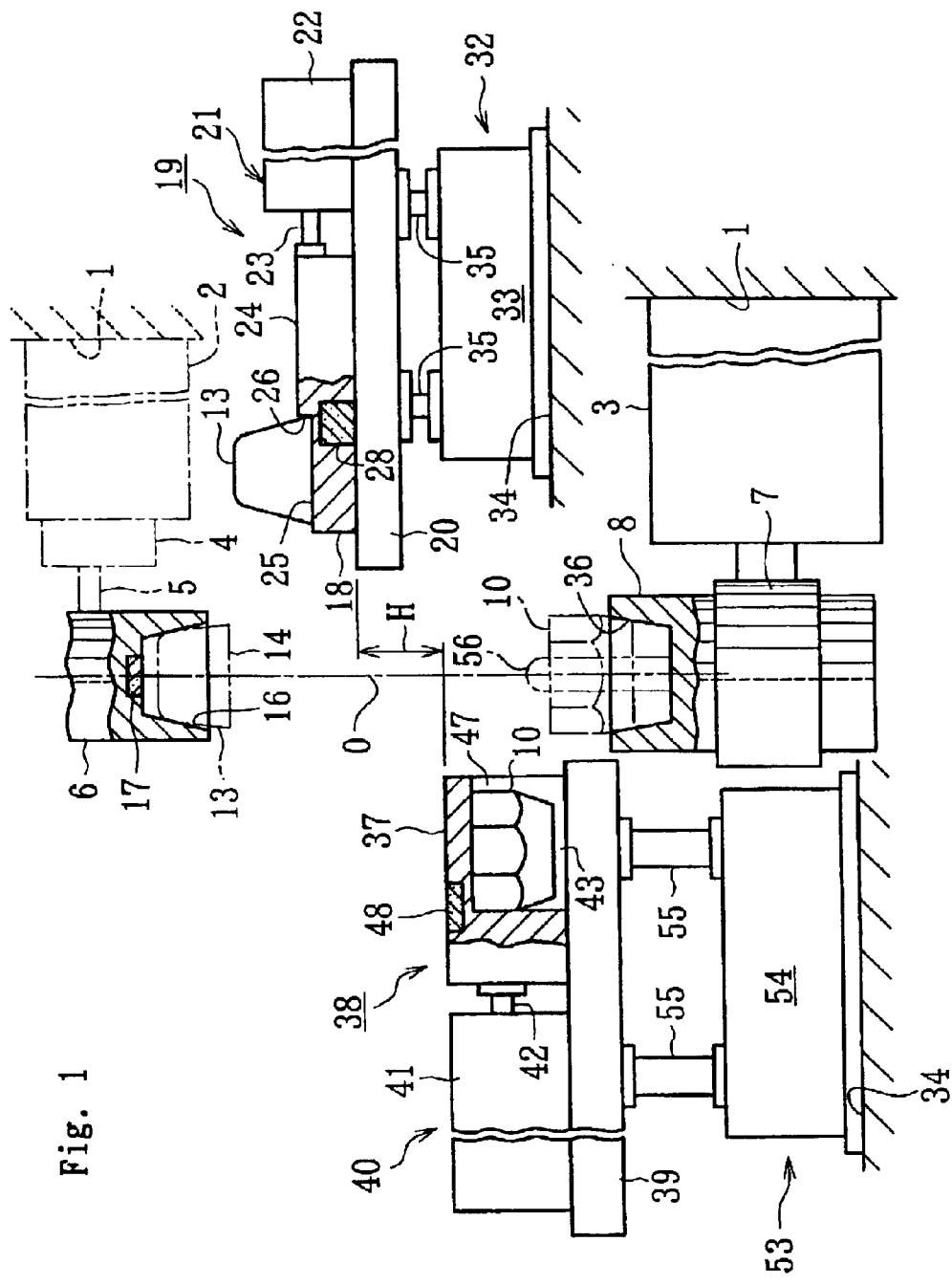
FIG. 1 is an elevational view of the welding device according to an embodiment of the invention.

Referring first to an embodiment shown in FIG. 1, support arms 2 and 3 are installed, projecting from a welding device main body, or a support column 1, one support arm 2 having a movable electrode 6 attached thereto through an air cylinder 4 and a connecting member 5. In FIG. 1, the air cylinder 4 and the connecting member 5 are schematically shown in considerably reduced size. The other support arm 3 has a fixed electrode 8 firmly fixed thereto through a connecting member 7. The two electrodes 6 and 8 are circular in cross section and made of copper alloy, and coaxially disposed. The reference character O denotes the axis thereof.

Figure 11A:
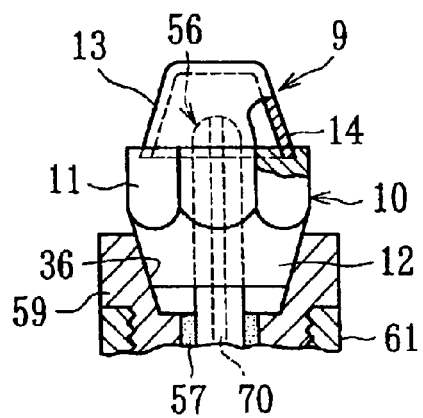
FIG. 11A is a partially broken side view of the box nut.
Figure 11B:
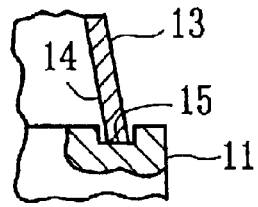
FIG. 11B is an enlarged view in part of the box nut.

The shape of the box nut will now be described with reference to FIG. 11. This box nut 9 is a hub nut for fixing an automobile wheel. The nut main body 10 consists of a hexagonal portion 11 and a taper portion 12 of circular cross section, the taper portion 12 being forced into the wheel hole whereby the wheel attaching position is set. The cap 13 forming the box portion is made by pressing a steel plate into a bowl shape. The open end 14 of the cap 13 is adapted to be snugly fitted in a circular groove 15 formed in the end surface of the nut 10.

Reference is made back to FIG. 1 for further description. A recess 16 in the form of a circular taper hole is formed in the lower end surface of the movable electrode 6, and the cap 13 is inserted therein, whereby the cap 13 is received and held with its open end 14 open downward. In addition, embedded in the inner region of the recess 16 is a magnet (permanent magnet) for holding the cap 13 by attraction force.

The cap 13 is held by a feed member 18 and brought to the recess 16. Therefore, the feed member 18 is moved toward the electrode axis O at least after the cap 13 is positioned coaxial with the electrode axis O. To this end, a cap feeding mechanism 19 is installed that causes the feed member 18 to execute a square motion. This mechanism 19, also shown in FIGS. 2 and 3, has a horizontally installed base plate 20, on which the feed member 18 is mounted for advance and retraction, the advancing and retracting directions thereof are orthogonal to the axis O. A driving means 21 is installed to effect such advance and retraction. The driving means 21 may be of the electrically powered type, such as an AC servomotor, but herein it is an air cylinder 22 fixed to the base plate 20, with the piston rod 23 connected to the feed member 18. In addition, the feed member 18 is made of a thick stainless steel plate, which is a nonmagnetic material, as shown.

Figure 2:
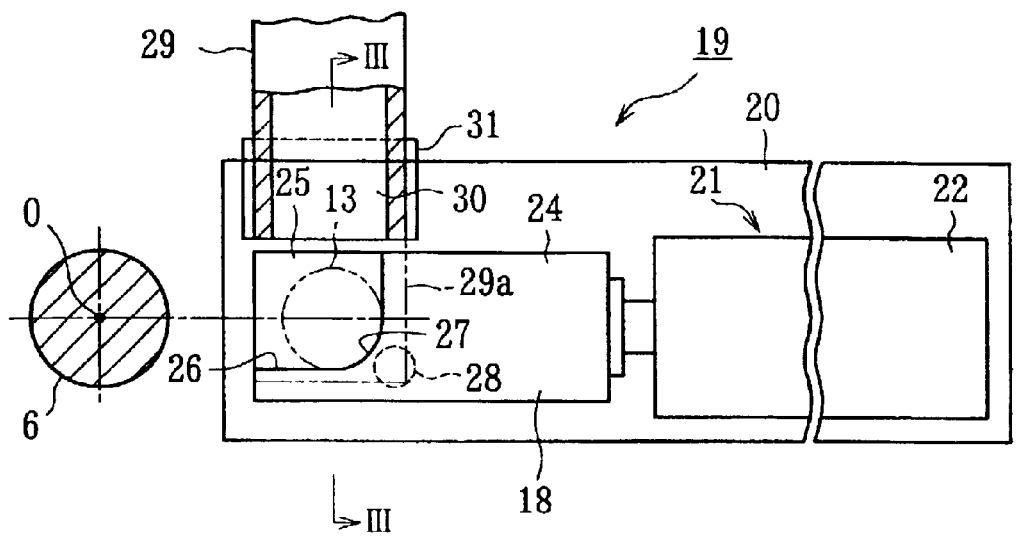
FIG. 2 is a plan view of the cap feed mechanism.
Figure 3:
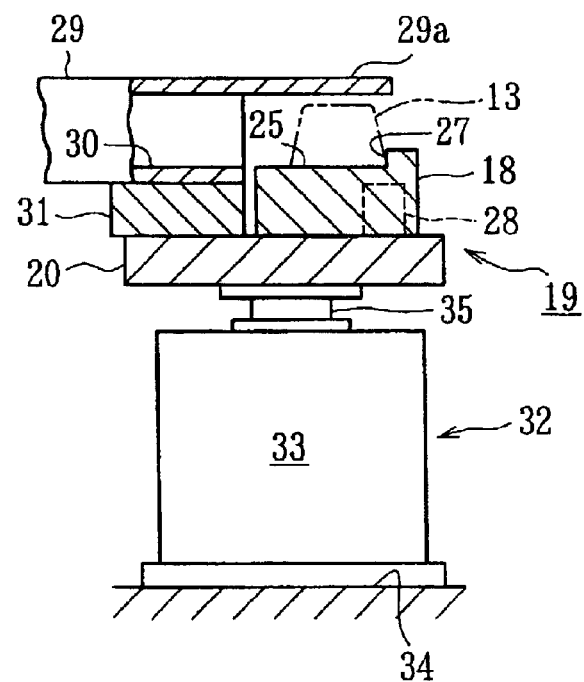
FIG. 3 is a cross-sectional view taken along the line III—III in FIG. 2.

As shown in FIG. 2, the feed member 18 is formed with a flat guide surface 25 whose level is lower than that of the surface 24 of the same member, the level difference forming a guide wall 26. The cap 13 advances from the upper area of FIG. 2 and relatively moves out to the left-hand side of the same figure. The cap 13 is positioned by the guide wall 26 and in this state it is temporally locked; therefore an arcuate portion 27 conforming to the cap 13 is formed, and a magnet (permanent magnet) is embedded in the feed member 18 to attract the cap 13 to the arcuate portion 27.

In order to slide the cap 13 onto the guide surface 25, a chute 29 is connected to the base plate 20. The chute 29 is quadrangular in section, and in order to make its bottom surface 30 continuous with the guide surface 25, a seat member 31 is fixed on the base plate 20 and the chute 29 is fixed on the seat member 31. The chute 29, though not shown, is connected to a parts feeder via a supply hose. In order to prevent the cap 13 from deviating as when some member contacts the cap 13 on the guide surface 25, part of the chute 29 is extended like a visor to provide a protector plate 29a.

In order to move the cap 13 along the axis O, a driving means 32 is attached to a stationary member 34. The driving means 32, which may be of an electrically driven type, such as an AC servomotor, is herein an air cylinder 33 fixed to the stationary member 34, with its piston rods 35 connected to the base plate 20. Since the air cylinder 33 used therein is of the tandem type, the piston rods 35 respectively project from the two housed-cylinders.

The mechanism for feeding nuts 10 to the fixed electrode 8 is substantially the same as the nut feeding mechanism 19 described above. The upper end surface of the fixed electrode 8 is formed with a recess 36 in the form of a circular taper hole, into which the taper portion 12 of the nut 10 is inserted so that the nut 10 is received and held.

Figure 4:
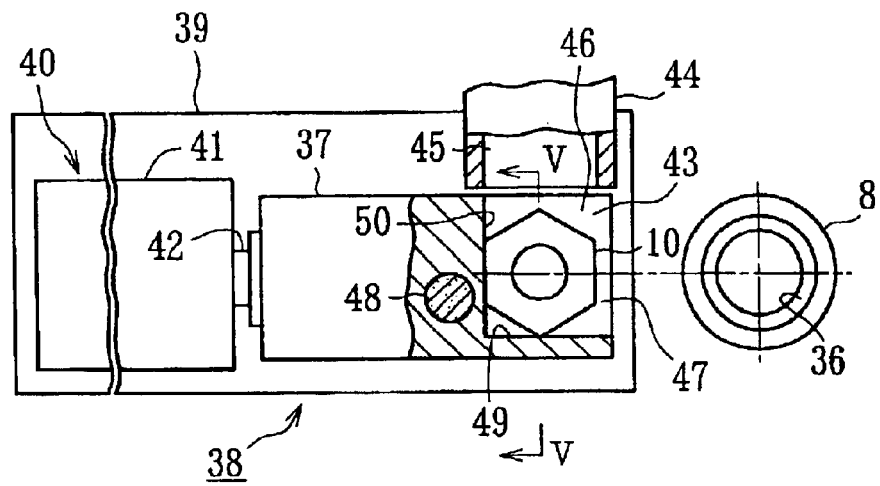
FIG. 4 is a plan view of the nut feed mechanism.
Figure 5:
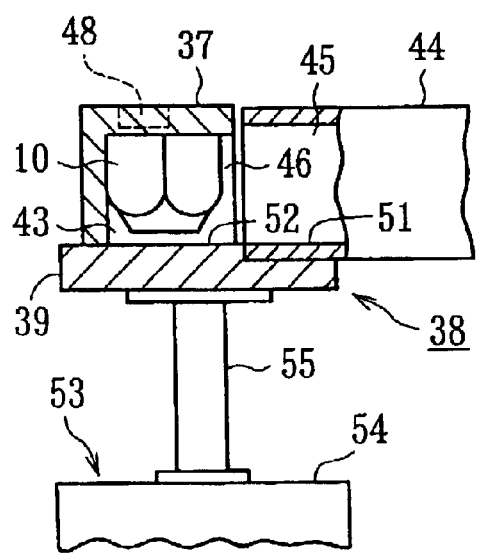
FIG. 5 is a cross-sectional view taken along the line V—V in FIG. 4.

The nut 10 is held by the feed member 37 and carried to the recess 36; therefore, at least after the nut 10 is positioned coaxial with the electrode axis O, the feed member 37 is moved along the electrode axis O. To this end, a nut feeding mechanism 38 is installed that causes the feed member 37 to execute a square motion. This mechanism 38 is also shown in FIGS. 4 and 5, wherein a base plate 39 is installed in a horizontal position, on which the feed member 37 is mounted in such a manner that it can be advanced and retracted, and the advancing and retracting directions are at right angles with the axis O. A driving means 40 is installed to allow such advance and retraction. The driving means 40 may be of the electrically powered type, such as an AC servomotor, but herein it is an air cylinder 41 fixed to the base plate 39, with its piston rod 42 connected to the feed member 37. In addition, the feed member 37 is in the form of a block member made of stainless steel, which is a nonmagnetic material, as shown.

As shown in FIGS. 1, 4 and 5, the feed member 37 is formed with a nut receiving chamber 43. The receiving chamber 43 has an inlet portion 46 aligned with a passageway 45 in the chute 44, and an outlet portion 47 through which the nut 10 relatively leaves the receiving chamber 43. A magnet (permanent magnet) 48 is embedded in the feed member 37 for attracting and temporally locking the nut in the receiving chamber 43. The position is set such that the nut 10 contacts the guide surfaces 49 and 50 and is thereby positioned. That is, as shown in FIGS. 4 and 5, it is close to a location where the guide surfaces 49 and 50 cross each other.

The chute 44 is connected to the base plate 39 to smoothly move the nut 10 in the receiving chamber 43. The chute 44 is quadrangular in cross section and is connected to the base plate 39 such that its bottom surface 51 is continuous with the surface 52 of the base plate 52. The chute 44, though not shown, is connected to a parts feeder via a supply hose.

In order to move the nut 10 along the axis O, a driving means 53 is attached to the stationary member 34. In order to move the nut 10 along the axis O, a driving means 53 is attached to the stationary member 34. The driving means 53 may be of the electrically powered type, such as an AC servomotor, but herein it is an air cylinder 54 fixed to the stationary member 34, with its piston rods 55 connected to the base plate 39. Since the air cylinder 54 used therein is of the tandem type, the piston rods 55 respectively project from the two housed cylinders.

Figure 6:
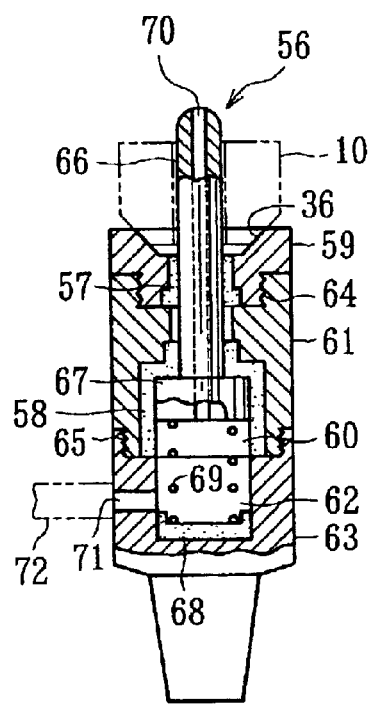
FIG. 6 is a longitudinal section of the fixed electrode.

FIG. 6 is a detailed structural sectional view of the fixed electrode 8, wherein a guide pin 56 is supported by insulators 57 and 58. The electrode 8 comprises an upper member 59 formed with a recess 36, an intermediate member 61 having a piston chamber 60, and a lower member 63 likewise having a piston chamber 62, and the three members are integrated at threaded portions 64 and 65. The insulator 57 is installed on the upper member 59, and the insulator 58 is installed on the intermediate member 61. The guide pin 56 comprises a pin portion 66 and a piston portion 67. The pin portion 66 slides on the insulator 57 and the piston portion 67 slides on the insulator 58. An insulator 68 is also installed on the bottom of the piston chamber 62, and a compression coil spring 69 is installed between the insulator 68 and the piston portion 67. The guide pin 56 is centrally formed with an air passageway 70, while the lower member 63 is formed with an air hole 71 in order for the air hose 72 to feed compressed air.

Figure 7:
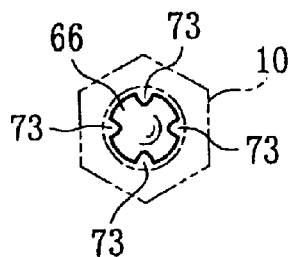
FIG. 7 is a plan view showing a modification of the guide pin.
Figure 13:
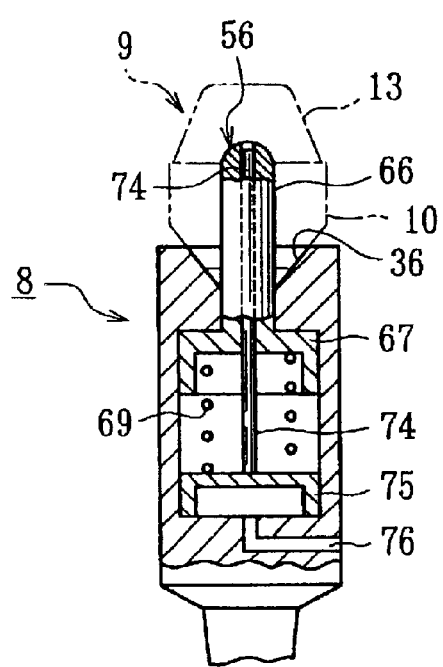
FIG. 13 is a longitudinal section showing a modification of the escape means.

The air passageway 70 formed in the guide pin 56 is a means for allowing the box nut 9 after welding to escape from the recess 36 of the electrode 8. Instead of the air passageway 70 in the form of a through-hole, air grooves 73 may be formed in the outer peripheral surface of the pin portion 66, as shown in FIG. 7. As for this escape means, a projecting rod 74 as shown in FIG. 13 may be employed. The projecting rod 74 slidably extends through the center of the guide pin 56 and has a cup-shaped piston 75 slidably fitted in the lower end thereof, and a passageway 76 for compressed air opens thereto. When compressed air is fed in, the piston 75 is energetically moved to cause the rod 74 to push up the inside of the cap 13 to allow the box nut 9 to escape from the recess 36.

The movable electrode 6 will be described with reference to FIG. 8. The electrode 6 has three members, a lower member 77 formed with a recess 16, an intermediate member 79 having a piston chamber 78, and an upper member 82 having electric wires 80 and 81 connected thereto, said three members being integrated at threaded portions 83 and 84.

Piston 85 is in the form of a vessel 87 having a magnet (permanent magnet) 86 received therein, and a conductive pin 88 in contact with said vessel 87 is made integral with the vessel 87. This vessel 87 is made of stainless steel, which is a nonmagnetic material, while the conductive pin 88 is made of iron material, which is a magnetic material. A conductive pin 88 slidably extends through an insulator 89 installed on the lower member 77, and a piston 85 is slidably inserted in a cylindrical insulator 90 installed in the inside of the intermediate member 79.

An insulator 91 is installed in the inside of the upper member 82, and a conductive plate 92 is attached to the innermost region of the insulator 91. A compression coil spring 93 is interposed between the conductive plate 92 and the piston 85. The electric wire 80 is connected, in its insulated state, to the conductive plate 92, while the other electric wire 81 is connected to the outer surface of the upper member 82. Therefore, when the cap 13 enters the recess 16, the attractive force of the magnet 86 acts on the cap 13 through the conductive pin 88 to hold the cap 13 in the recess 16. At this point in time, if the cap 13 contacts the conductive pin 88 and the inner surface of the recess 16, a current flows between the electric wires 80 and 81 to transmit the presence of the cap 13 as a signal. That is, the current flows through the conductive plate 92, compression coil spring 93, piston 85, conductive pin 88, cap 13, lower member 77, intermediate member 79, upper member 82, and electric wire 81.

The operation of the above embodiment will now be described. FIG. 1 shows the state in which the feed members 18 and 37 hold the cap 13 and the nut 10. When the air cylinders 22 and 41 are actuated in this state, the feed members 18 and 37 are advanced toward the axis O until the cap 13 and the nut 10 are coaxial with the axis O, whereupon the advance of the feed members 18 and 37 stops. Subsequently, when the air cylinders 33 and 54 are actuated, the cap 13 is moved upward on the axis O while the nut 10 is moved downward on the axis O. As a result of this axial movement, the cap 13 is received in the recess 16 and subjected to the attractive force of the magnet 17 (or the attractive force of the conductive pin 88), and on the other hand, the taper portion 12 of the nut 10 enters the recess 36 while the guide pin 56 is relatively advancing into the threaded hole in the nut 10.

In the above-identified state, this time the air cylinders 22 and 41 are retracted, whereupon the feed members 18 and 37 are retracted while leaving the cap 13 and nut 10 in the recesses 16 and 36. And the movable electrode 6 is advanced so as to weld the cap 13 to the nut 10. After or before this, the air cylinder 33 is contracted while the air cylinder 54 is extended so as to return to the solid-line position shown in FIG. 1. A series of such actions imparts square motions to the feed members 18 and 37. In addition, the control for realizing said series of actions can be easily embodied by the use of systems generally employed, including electric type air switching valves, and sequence circuits.

The embodiment described above can be realized even if both electrodes, the cap feeding mechanism and nut feeding mechanism, etc. respectively exchange their vertical positions with each other. Also, it can be realized even if the axis O is horizontal.

Figure 12:
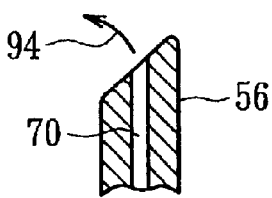
FIG. 12 is a longitudinal section in part of a modification of the guide pin.

FIG. 12 shows the oblique cutting of the front end of the guide pin 56 to ensure that the box nuts 9 are thrown in a fixed direction indicated by an arrow 94 rather than being scattered, a convenient arrangement facilitating box nut reception in a receiving box.

Figure 8:
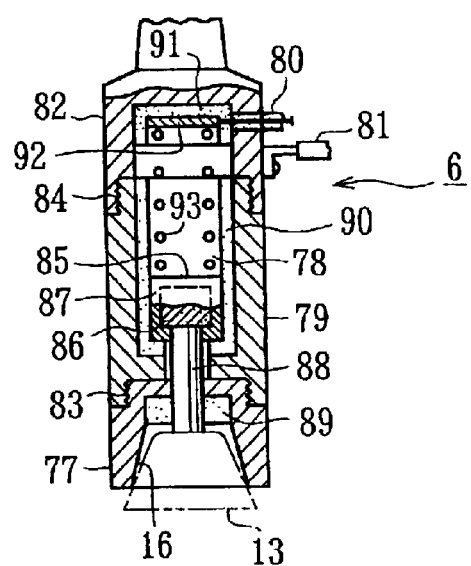
FIG. 8 is a longitudinal section of the movable electrode.
Figure 9:
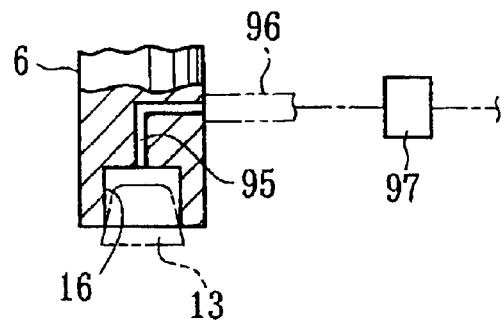
FIG. 9 is a longitudinal section showing a modification of the movable electrode.

FIG. 9 shows vacuum suction substituted for the cap attraction by a magnet as shown in FIGS. 1 and 8. An air passageway 95 opens into the recess 16 and is connected to a detector 97 through an air hose 96. When the cap 13 fits in the recess 16 as shown in FIG. 9, the degree of vacuum is so high that the detector 97 emits a signal indicating normality. If the cap 13 is not held in the recess 16, the degree of vacuum is low, which the device 97 detects, emitting an abnormality signal to avoid a null stroke of the movable electrode 6.

Figure 10:
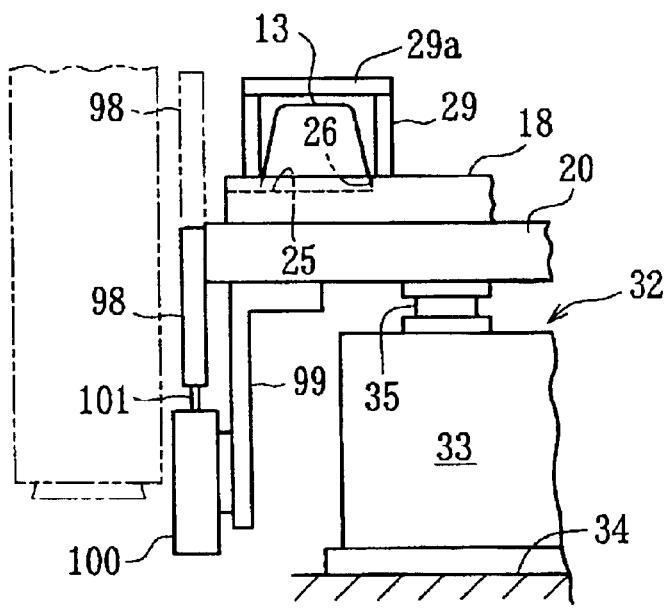
FIG. 10 is an elevational view showing the control plate.

FIG. 10 shows measures to prevent the cap from being drawn by the magnetic field generated when a welding current is flowing between both electrodes. Such phenomenon may occur depending on various ambient conditions. Thus, a control plate 98 to prevent the movement of the cap 13 is installed for advance and retraction between the feed member 18 and the advanced movable electrode 6. A bracket 99 is fixed on the base plate 20 and an air cylinder 100 is attached to the bracket 99, with the control plate 98 fixed on the piston rod 101. When a welding current is flowing, the control plate 98 rises to the chain double-dashed line position shown in FIG. 10, to prevent the movement of the cap 13.

Figure 14:
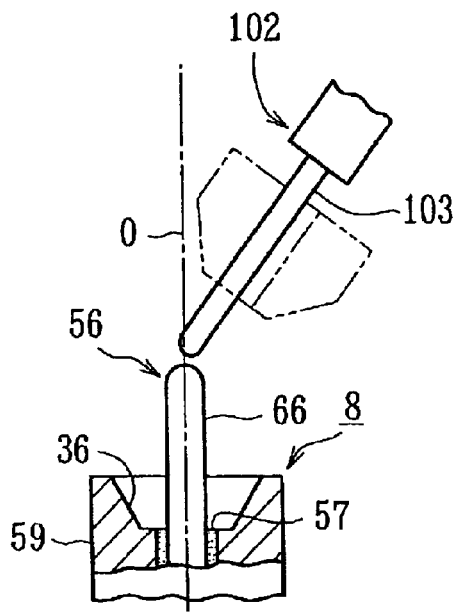
FIG. 14 is a side view showing a modification using a feed rod.

FIG. 14 shows another embodiment, wherein the nut feeding mechanism 38 is composed of a feed rod 102 adapted to be advanced and retracted in a direction inclined with respect to the axis O. A guide rod 103 for the feed rod 102 pierces through the threaded hole in the nut 10 in a lance fashion to meet the guide pin 56. The nut 10 sliding down the guide rod 103 is transferred from the front end of the guide rod 103 to the front end of the guide pin 56.

Such an arrangement may be adopted wherein in both the cap and the nut, the feed member is slidably mounted on the base plate and is advanced and retracted while the base plate is advanced and retracted along the axis of the electrodes. This arrangement enables both the cap and the nut to perform individual square motions to ensure reliable feeding of parts to each electrode. Further, the cap feeding mechanism and the nut feeding mechanism are never disposed one above the other. Both mechanisms may be opposed to each other as shown in FIG. 1 or the advancing and retracting directions of both feed members may cross each other at, e.g., 90 degrees. This allows the spacing between both electrodes to be determined on the basis of the distance necessary for advance and retraction of both feed members, whereby the space occupied by the entire device can be made as small as possible. At the same time, the electrode stoke can be minimized. Disposing both feed members as close to the axis O as possible minimizes the feed member stroke so as to shorten the operating cycle time.

The reference numeral 56 denotes a guide pin erected at the center of the fixed electrode 8, assisting in the reception of the nut as it relatively enters the threaded hole when the nut 10 is received in the recess 36. Though not illustrated, the guide pin 56 is adapted to be depressed by a compression coil spring in the movable electrode 8.

Figure 15:
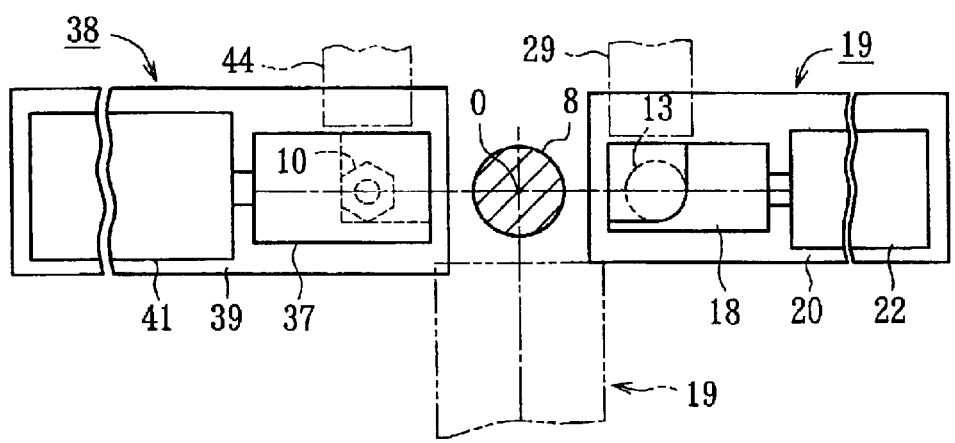
FIG. 15 is a schematic plan view of the device of FIG. 1, showing relative positions of the feed members.

The feed member 18 of the cap feeding mechanism 19 and the feed member 37 of the nut feeding mechanism 38 are in positional relation such that when they advance to the electrode axis O, they do not cause interference such as contact or collision. That is, a spacing H (FIG. 1) is set so that the lower portion of the front end of the feed member 18 and the upper portion of the front end of the feed member 37 do not interfere with each other. Further, as is apparent from FIG. 15, the advancing and retracting directions of feed member 18 of the cap feeding mechanism 19 and the advancing and retracting directions of the feed member 37 of the nut feeding mechanism 38 are opposed to each other in a straight line or cross each other as seen in the direction of the axis O of the electrodes. That is, when seen planewise, the entire device of FIG. 1 is as shown in FIG. 15. In the case of the solid lines in FIG. 15, the advancing and retracting directions of both feed members 18 and 37 are opposed to each other in a straight line, while they cross each other when the cap feeding mechanism 19 is disposed in a position turned through 90 degree shown in phantom lines. The crossing angle is selected according to circumstances; for example, it is 45 or 60 degrees. Therefore, it follows that the advancing and retracting axes of both feed members 18 and 37 cross each other.

Figure 16:
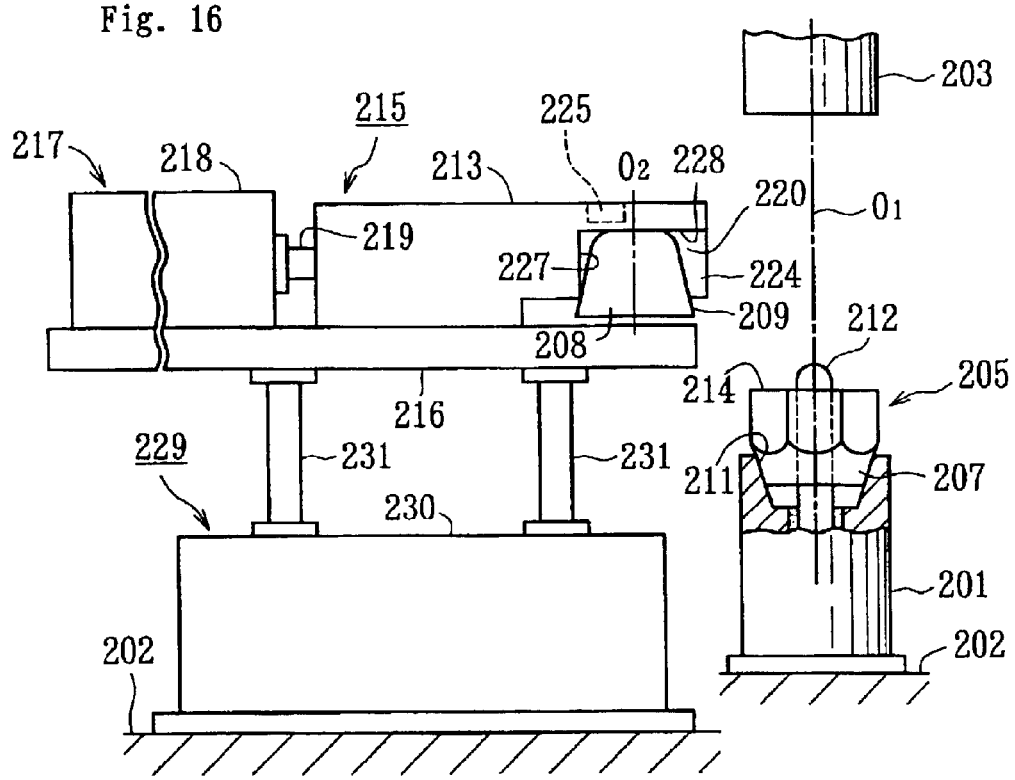
FIG. 16 is an elevational view of the box nut welding device showing other embodiment of the invention.

Referring to FIG. 16 in the welding device main body (not shown), a fixed electrode 1 is fixed on a stationary member 2 and a movable electrode 3 is disposed coaxial therewith. Both electrodes 2 and 3 are disposed on the same axis 01 that extends vertically.

Figure 25A:
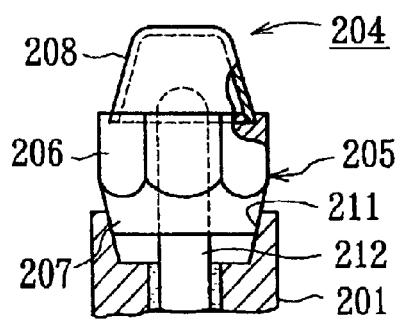
FIG. 25A is a side view of the box nut.
Figure 25B:
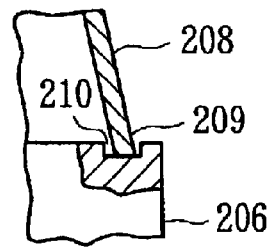
FIG. 25B is an enlarged view in part of the box nut shown in FIG. 25A.

The shape of the box nut will now be described with reference to FIGS. 25A and 25B. This box nut 204 is a hub nut for fixing an automobile wheel. The nut main body 205 consists of a hexagonal portion 206 and a taper portion 207 of circular cross section, the taper portion 207 being forced into the wheel hole whereby the wheel attaching position is set. The cap 208 forming the box portion is made by pressing a steel plate into a bowl shape. The open end 209 of the cap 208 is adapted to be snugly fitted in a circular groove 210 formed in the end surface of the nut 205. In addition, the width of the groove 210 is shown enlarged herein for better understanding.

Reference is made back to FIG. 16 for further description. The fixed electrode 201 is formed with a recess 211 for holding the nut 205. Here, since the recess 211 receives the taper portion 207, it is also formed as a taper hole. Further, the fixed electrode 201 has a guide pin 212 installed thereon that extends through the threaded hole in the nut 205. Various methods of feeding the nut 205 to the recess 211 may be employed. For example, a method that uses a feed rod for piercing through the threaded hole in the nut in a lance fashion to feed the nut, and a method that uses a magnet installed in a feed rod for attracting the nut to feed the latter may be employed.

The cap 208 is held by a feed member 213 and brought to the upper end surface 214 of the nut 205, and the feed member 213 is moved along the electrode axis O1 at least after the axis O2 of the cap 208 is positioned coaxial with the electrode axis O1. To this end, a cap feeding mechanism 215 is installed for causing the feed member 213 to execute a square motion. This mechanism 215, also shown in FIGS. 17 and 18, has a horizontally installed base plate 216, on which the feed member 213 is mounted for advance and retraction, the advancing and retracting directions thereof are orthogonal to the axis O1. A driving means 217 is installed to effect such advance and retraction. The driving means 217 may be of the electrically powered type, such as an AC servomotor, but herein it is an air cylinder 218 fixed to the base plate 216, with the piston rod 219 connected to the feed member 213. In addition, the feed member 213 is made of a stainless steel block member, which is a nonmagnetic material, as shown.

Figure 17:
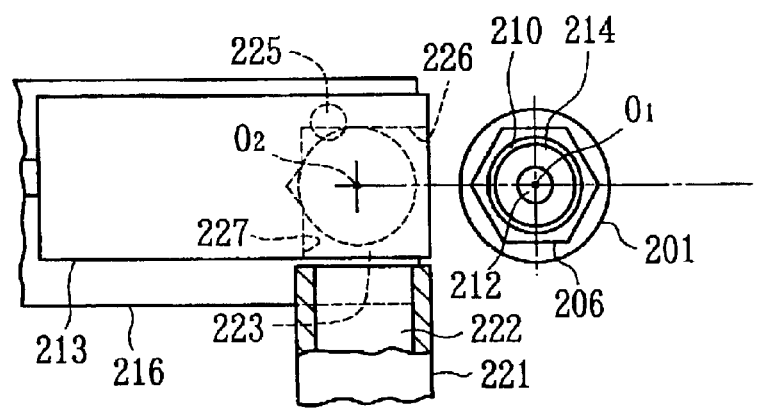
FIG. 17 is a partial plan view of the device shown in FIG. 16.
Figure 18:
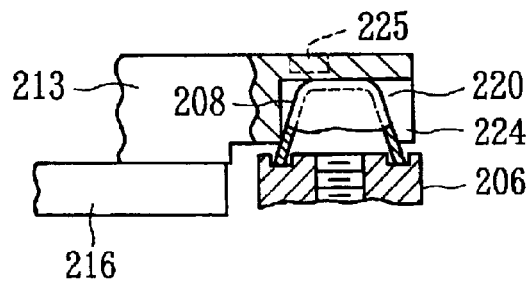
FIG. 18 is a sectional view showing the cap and nut assembled together.

As shown in FIGS. 16, 17, and 18, the feed member 213 is formed with a nut receiving chamber 220. A cap feeding chute 221 is disposed close to the receiving chamber 220 and an inlet 223 is provided that is opposed to and communicates with a passageway 222. Further, an outlet 224 is provided for the cap 208 to relatively goes out of the receiving chamber 220. To hold the cap 208 in the receiving chamber 220, an attracting means is installed. Herein, it is realized by a magnet (permanent magnet) 225, the location of installation of the magnet 225 being set such that the cap 208 contacts the inner walls 226, 227, and 228 of the receiving chamber 220 so that the positioning of the cap is effected. That is, as shown, it is installed adjacent the corner of the receiving chamber 220. In addition, vacuum may be used instead of the magnet.

In order to move the cap 208 along the axis O1, a driving means 229 is attached to the stationary member 202. The driving means 229, which may be of an electrically driven type, such as an AC servomotor, is herein an air cylinder 230 fixed to the stationary member 202, with its piston rods 231 connected to the base plate 216. Since the air cylinder 230 used therein is of the tandem type, the piston rods 231 respectively project from the two housed-cylinders.

Figure 19:
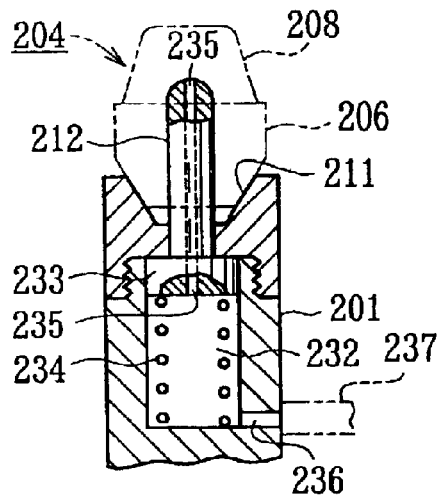
FIG. 19 is a longitudinal section of the fixed electrode.

A guide pin 212 erected at the center of the fixed electrode 201 assists in the reception of the nut 205 as it relatively enters the threaded hole when the nut 205 is received in the recess 211. The guide pin 212 has a construction as shown in FIG. 19 and is adapted to advance and retract. The fixed electrode 201 is internally formed with a cylinder chamber 232, in which a piston 233 integral with the guide pin 212 is slidably inserted. A compression coil spring 234 disposed in the cylinder chamber 232 exerts a force on the guide pin 212 in the projecting direction. The guide pin 212 is formed with an air hole 235 and compressed-air spouting therethrough is used to remove the box nut 204 having undergone welding. The reference characters 236 and 237 denote an air hole to the cylinder chamber 232 and an air hose connected thereto, respectively.

As can be understood from FIGS. 16 and 18, the open end 209 of the cap 208 projects beyond the lower surface of the feed member 213. This prevents the lower surface of the feed member 213 from interfering with the upper portion of the nut, as shown in FIG. 18, when the feed member 213 descends along the axis O1.

The operation of the embodiment described above will now be described. FIG. 16 shows the cap 208 held by the feed member 213. When the air cylinder 218 is activated in this state, the feed member 213 is advanced toward the axis O1 until the axis O2 of the cap 208 becomes aligned with the electrode axis O1, whereupon the advance of the feed member 213 is stopped. In this state there is no possibility of both feed members 218 and 237 interfering with each other as described above. Subsequently, when the air cylinder 230 is activated, the cap 208 is moved downward on the axis O1. As a result of this axial movement, the cap 208 is mounted on the upper end surface 214 of the nut 205 on standby. At this time, the open end 209 of the cap 208 snuggly fits in the circular groove 210. That is, the state of FIG. 18 is established.

In the above-identified state, this time the air cylinder 218 is retracted, whereupon the feed member 213 is retracted while leaving the cap 208 on the upper end surface of the nut. Then, the movable electrode 203 is advanced so as to weld the cap 208 to the nut 205 through electric resistance. After or before this, the air cylinder 230 is extended so as to return to the solid-line position shown in FIG. 16. A series of such actions imparts a square motion to the feed member 213. In addition, the control for realizing the series of actions can be easily embodied by the use of systems generally employed, including electric type air switching valves and sequence circuits.

Figure 20:
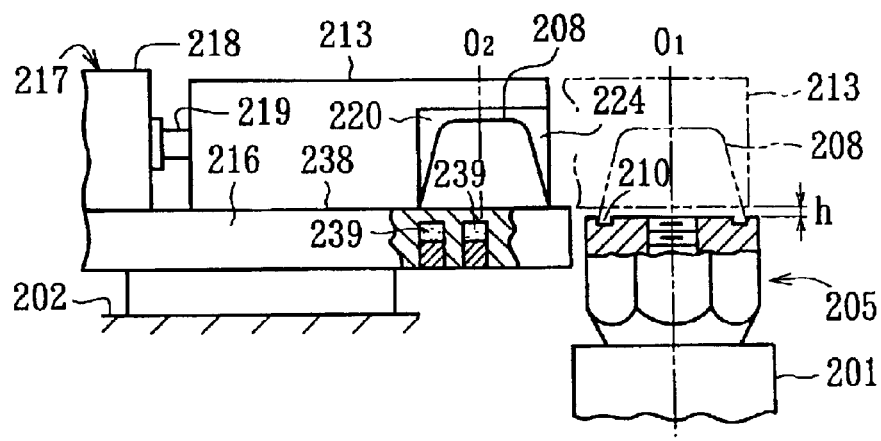
FIG. 20 is an elevational view similar to FIG. 16, showing a modification.
Figure 21:
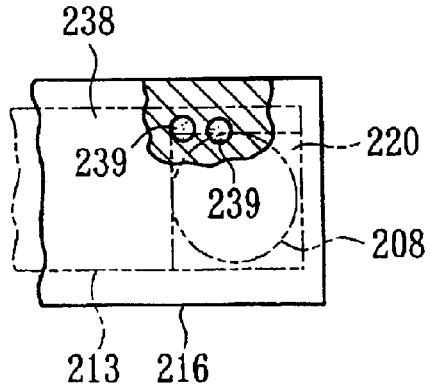
FIG. 21 is a partial plan view of the device shown in FIG. 20.

FIG. 20 shows an embodiment wherein the base plate 216 is stationary. The base plate 216 is fixed to the stationary member 202 and the cap 208 in the receiving chamber 220 slides on the surface 238 of the flat base plate 216. For positioning purposes at this time, the base plate 216 has magnets (permanent magnets) 239 embedded therein. The locations of installation of the magnets 239 are such that the cap 208 is attracted to the inner walls 226 and 227, as shown in FIG. 21. The upper end surface 214 of the nut 205 is set so that it is slightly below the surface 238 of the base plate, the level difference being indicated by the reference character H.

When the feed member 213 is advanced to the right from the state of FIG. 20, the cap 208 slides on the surface 238 while being attracted to the magnets 239. When the feed member 213 is further advanced, the attractive force of the magnets 239 on the cap 208 disappears and the cap 208 is carried onto the upper end surface 214 of the nut lying in the lower position. Then the open end 209 of the cap fits in the groove 210. Thereinafter, the feed member 213 returns, and the movable electrode is advanced, thus completing the welding.

Figure 22:
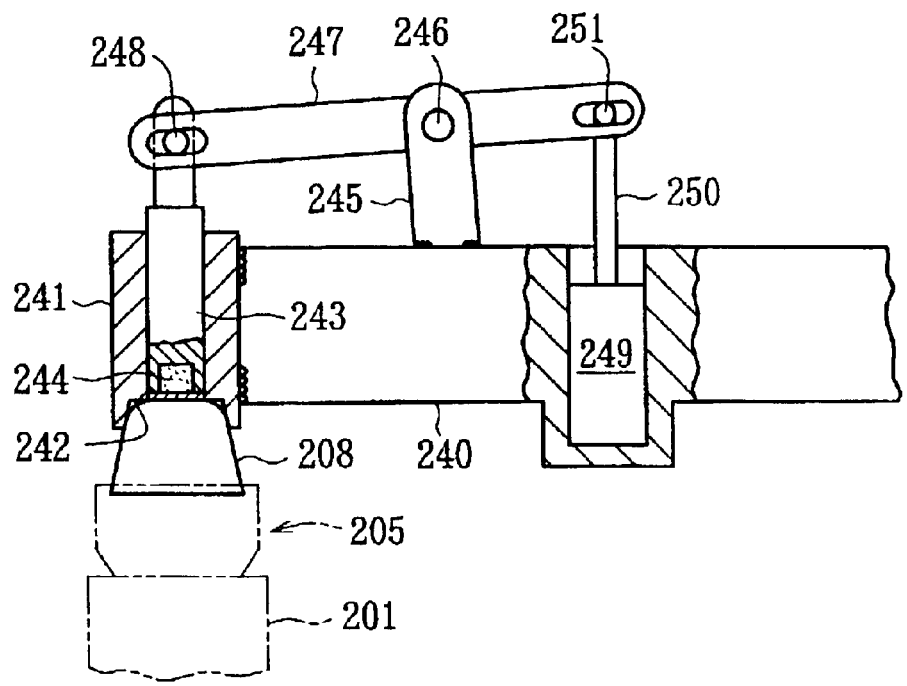
FIG. 22 is a side view showing a modification of the cap feed mechanism.

FIG. 22 shows a modification of the feeding mechanism for the cap 208. A holding sleeve 241 is welded to an actuating arm 240 and the lower end of the holding sleeve 241 is formed with a holding recess 242. The holding sleeve 241 has a control shaft 243 slidably fitted therein, and a magnet (permanent magnet) 244 is embedded in the lower end of the control shaft 243. The actuating arm 240 has a bracket 245 welded thereto and a shaft 246 fixed to the bracket 245 has an actuating lever 247 attached thereto. The lever 247 is connected at the left-hand end thereof to the control shaft 243 through a shaft 248 and is adapted to receive the output from an air cylinder 249 at its right-hand end. To this end, the piston rod 250 of the air cylinder 249 is connected to the right-hand end of the actuating lever 247 through a shaft 251.

FIG. 22 shows a state in which the upper portion of the cap 208 fits in the holding recess 242 and attracted by the magnet 244. When the piston rod 250 of the air cylinder 249 is retracted into the air cylinder, the actuating lever 247 is swung around the shaft 246 to pull up the control shaft 243. Thereupon, since the magnet 244 is moved away from the cap 208, the attractive force on the cap 208 disappears and the cap 208 is mounted on the nut 205. The cap 208 is fitted to the nut 205 by moving the actuating arm 240 upward and downward and turning it in a horizontal direction.

Figure 23:
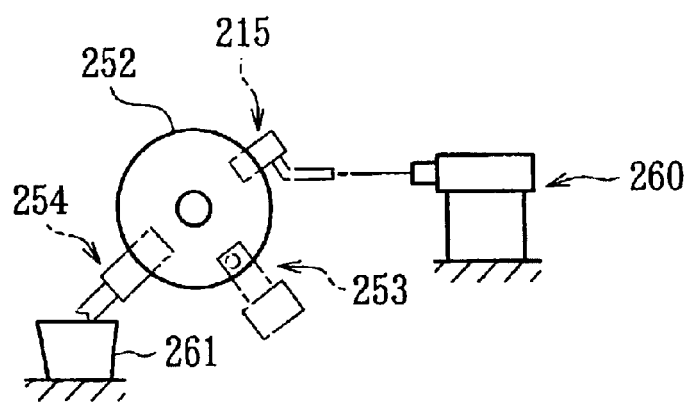
FIG. 23 is a diagrammatic plan showing an application in a turn table.

An embodiment shown in FIGS. 23 and 24 will now be described. In this embodiment, the invention is applied to a turntable 252 having installed thereon a cap feeding mechanism 215, a welder 253 and a removing section 254. An insulation sleeve 255 is installed in the turntable 252, having an intermediate electrode 256 slidably fitted therein, and a compression coil spring 258 is interposed between a flange 257 formed on the electrode 256 and the insulation sleeve 255. The intermediate electrode 256 is provided with a recess 259 for holding the nut 205.

Figure 24:
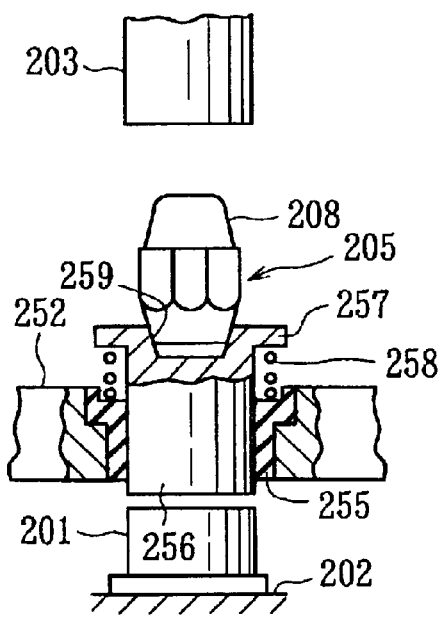
FIG. 24 is a partial longitudinal section of the device shown in FIG. 23.

When the movable electrode 203 descends from the state of FIG. 24 and hits the cap 208, the compression coil spring 258 is compressed until the intermediate electrode 256 presses the fixed electrode 201, whereupon a current is passed to weld the nut and cap. In addition, in FIG. 23, the reference numeral 60 denotes a parts feeder for caps, and 261 denotes a vessel for receiving box nuts having undergone welding.

What is claimed is:

1. A box nut welding method comprising:
   providing a first electrode with a recess for receiving and holding a bowl-shaped cap;
   providing a second electrode with a recess for receiving and holding a nut;
   fitting a bowl-shaped cap into the recess of the first electrode;
   fitting a nut into the recess of the second electrode;
   advancing at least one of the electrodes such that the open end of the cap and the end surface of the nut held by the respective electrodes are pressed against each other; and
   passing a welding current through the first and second electrodes, thereby welding the cap and nut to form a box nut;
   wherein a guide pin adapted to fit into a threaded hole in the nut is installed in the recess of the second electrode, said guide pin having a central hole along its longitudinal direction for assisting a box nut to escape from the electrode recess after welding the nut and the cap to form the box nut.

2. A box nut welding method as set forth in claim 1, wherein the cap and nut are moved axially of the electrodes after their axes are positioned coaxial with the axis of the electrodes, and then they are received and held in the recesses of the electrodes.

3. A box nut welding method as set forth in claim 1, wherein the cap and nut reach the recesses of the electrodes as they are held by respective feed members.

4. A box nut welding device comprising:
   a first electrode with a recess for receiving and holding a bowl-shaped cap;
   a second electrode with a recess for receiving and holding a nut, both electrodes being disposed on the same axis;
   a cap feeding mechanism for carrying the cap to the recess of the first electrode subsequent to the positioning of the cap coaxial with the electrode axis; and
   a nut feeding mechanism for carrying the nut to the recess of the second electrode subsequent to the positioning of the nut coaxial with the electrode axis;
   wherein a guide pin adapted to fit into a threaded hole in the nut is installed in the recess of the second electrode, said guide pin having an air passage along its longitudinal direction for assisting a box nut to escape from the electrode recess after welding the nut and the cap to form the box nut.

5. A box nut welding device as set forth in claim 4, further comprising a driving means for driving feed members of the cap feeding mechanism and the nut feeding mechanism.

6. A box nut welding device comprising:
   a first electrode with a recess for receiving and holding a bowl-shaped cap;
   a second electrode with a recess for receiving and holding a nut, both electrodes being disposed on the same axis;
   a cap feeding mechanism for carrying the cap to the recess of the first electrode subsequent to the positioning of the cap coaxial with the electrode axis; and
   a nut feeding mechanism for carrying the nut to the recess of the second electrode by a feed rod advancing in a direction inclined with respect to the axis of the electrodes;
   wherein a guide pin adapted to fit into a threaded hole in the nut is installed in the recess of the second electrode, said guide pin having a central hole along its longitudinal direction for assisting a box nut to escape from the electrode recess after welding the nut and the cap to form the box nut.

7. A box nut welding device comprising:

a first electrode with a recess for receiving and holding a bowl-shaped cap;

a second electrode with a recess for receiving and holding a nut, both electrodes being disposed on the same axis;

a cap feeding mechanism for carrying the cap to the recess of the first electrode subsequent to the positioning of the cap coaxial with the electrode axis; and a nut feeding mechanism for carrying the nut to the recess of the second electrode subsequent to the positioning of the nut coaxial with the electrode axis, a feed member of the cap feeding mechanism for holding the cap and a feed member of the nut feeding mechanism for holding the nut having a relative position such that when both feed members are advanced, they do not interfere with each other;

wherein a guide pin adapted to fit into a threaded hold in the nut is installed in the recess of the second electrode, said guide pin having a central hole along its longitudinal direction for assisting a box nut to escape from the electrode recess after welding the nut and the cap to form the box nut.

8. A box nut welding device as set forth in claim 7, wherein the advancing and retracting directions of the feed member of the cap feeding mechanism and the advancing and retracting directions of the feed member of the nut feeding mechanism are opposed to each other in a straight line as seen in the direction of the electrode axis or cross each other.

9. A box nut welding device comprising:

a first electrode with a recess for receiving and holding a bowl-shaped cap;

a second electrode with a recess for receiving and holding a nut, both electrodes being disposed on the same axis;

a cap feeding mechanism for carrying the cap to the recess of the first electrode subsequent to the positioning of the cap coaxial with the electrode axis; and a nut feeding mechanism for carrying the nut to the recess for the second electrode subsequent to the positioning of the nut coaxial with the electrode axis, a feed member of the cap feeding mechanism for holding the cap and a feed member of the nut feeding mechanism for holding the nut having a relative position such that when both feed members are advanced toward the electrode axis, they do not interfere with each other, the advancing and retracting directions of the feed member of the cap feeding mechanism and the advancing and retracting directions of the feed member of the nut feeding mechanism being opposed to each other in a straight line as seen in the direction of the electrode axis or crossing each other;

wherein a guide pin adapted to fit into a threaded hold in the nut is installed in recess of the second electrode, said guide pin having a central hole along its longitudinal direction for assisting a box nut to escape from the electrode recess after welding the nut and the cap to form the box nut.

10. A box nut welding device comprising a movable electrode and a fixed electrode that are disposed coaxial with a vertical axis, said fixed electrode being formed with a recess for holding a nut, a feed member adapted to advance and retract in a direction substantially at right angles with said axis while holding a cap, said feed member being constructed to move vertically along said axis, the arrangement being such that with a cap mounted on the nut held by the fixed electrode, the movable electrode is lowered to effect pressing and passage of current, wherein a guide pin adapted to fit into a threaded hole in the nut is installed in the recess of the fixed electrode, said guide pin having a central hole along its longitudinal direction for assisting a box nut to escape from the electrode recess after welding the nut and the cap to form the box nut.

11. A box nut welding device as set forth in claim 7, wherein the feed member of the cap feeding mechanism is formed with a cap receiving chamber.

12. A box nut welding device as set forth in claim 7, wherein a receiving chamber is provided which is opened in the lower side and is formed with an inlet opposed to and communicating with a cap feed chute and an outlet through which a cap relatively goes out of the receiving chamber, the receiving chamber having installed therein an attracting means for holding a cap.

13. A box nut welding device as set for in claim 10, wherein the open end of a cap fits in an annular groove formed in the end surface of a nut.

14. A box nut welding method as set forth in claim 2, wherein the cap and nut reach the recesses of the electrodes as they are held by respective feed members.

15. A box nut welding method as set forth in claim 4, wherein a front end of the guide pin has an oblique cutting.

16. A box nut welding method as set forth in claim 4, wherein the air passage is in fluid communication with a compressed air source.

17. A box nut welding method as set forth in claim 4, wherein the air passage is a central hole along a longitudinal direction of the guide pin, and a projection rod is provided slidably extending through the central hole.

18. A box nut welding method as set forth in claim 4, wherein the air passage is a groove formed on an outer peripheral surface of the guide pin central along a longitudinal direction of the guide pin.

* * * * *